United States Patent

[11] 3,559,770

| [72] | Inventors | Carl E. Bricker<br>Cuyahoga Falls;<br>Kenneth P. Hillegass, Akron, Ohio |
|---|---|---|
| [21] | Appl. No. | 797,803 |
| [22] | Filed | Feb. 10, 1969 |
| [45] | Patented | Feb. 2, 1971 |
| [73] | Assignee | The Goodyear Tire & Rubber Company<br>Akron, Ohio<br>a corporation of Ohio |

[54] DRUM BRAKE INCLUDING AXLE AND ACTUATING CYLINDER DETAIL
6 Claims, 6 Drawing Figs.

[52] U.S. Cl. .................................................. 188/18
    188/79, 188/79.5, 188/152
[51] Int. Cl. .................................................. B60t 1/06
[50] Field of Search ........................................ 188/18,
    79.550, 79, 152.81, 152.82

[56] References Cited
UNITED STATES PATENTS

| 1,877,081 | 9/1932 | Teves | 188/152(.82) |
| 2,026,401 | 12/1935 | Rockwell | 188/152(.82)X |
| 2,038,213 | 4/1936 | Frank | 188/152(.81) |
| 2,214,679 | 9/1940 | Scott | (188/152.82)UX |
| 2,471,865 | 5/1949 | Dieckmann | 188/79.550 |

FOREIGN PATENTS

| 598,636 | 2/1948 | Great Britain | 188/152(.82) |

Primary Examiner—George E.A. Halvosa
Attorneys—F.W. Brunner and Paul E. Milliken ABSTRACT: A brake having a rotary drum and a stationary axle with an integral cylinder housing. A thickened portion is provided at a desired position on the axle to form the cylinder housing in which one or more cylinders may be located. When the brakes are applied, the torque from the rotating drum is transmitted through the integral cylinder housing to the axle.

PATENTED FEB 2 1971 3,559,770

INVENTOR.
CARL E. BRICKER
BY KENNETH P. HILLEGASS

*Milliken*
ATTORNEY

INVENTOR.
CARL E. BRICKEL
BY KENNETH P. HILLEGASS

ATTORNEY

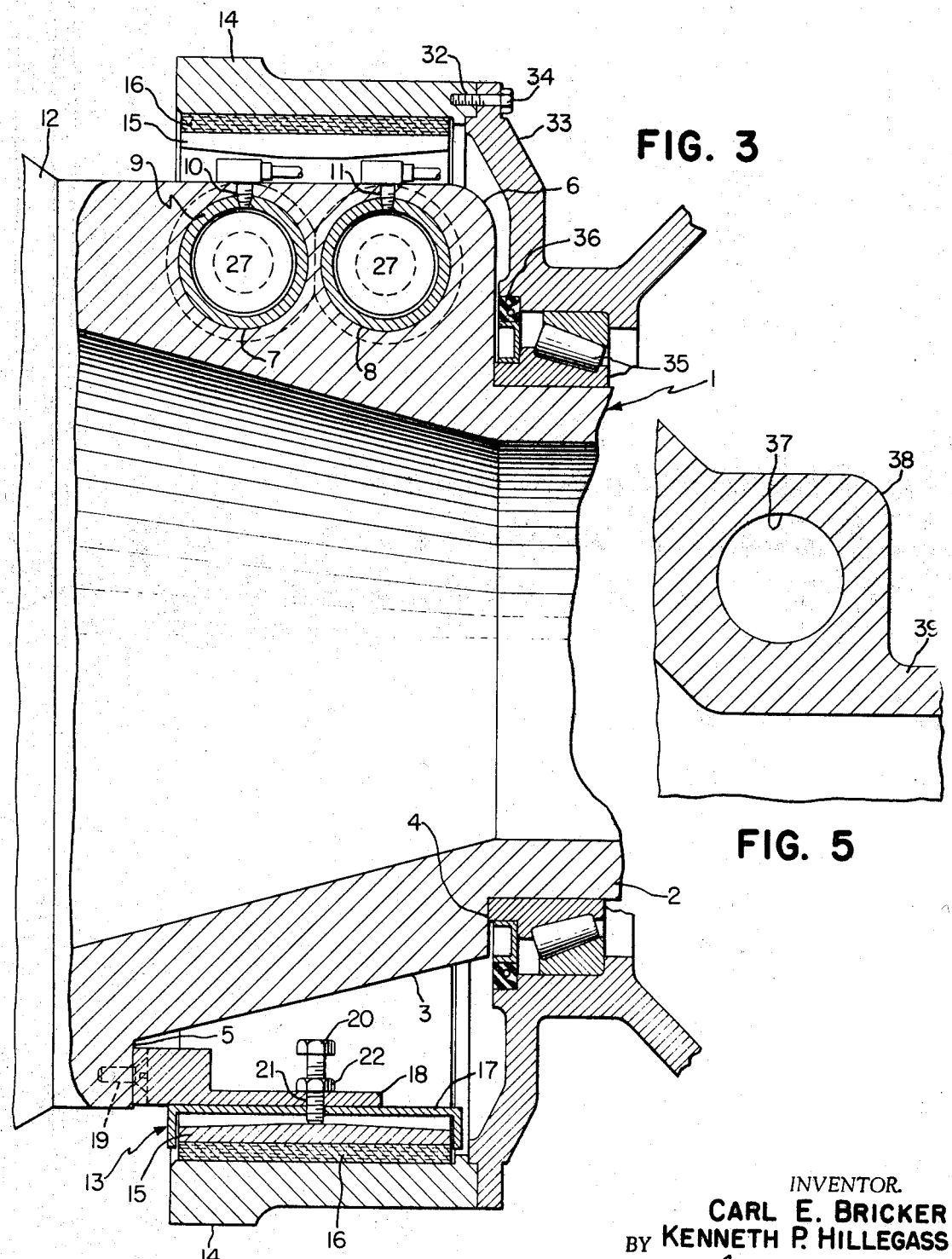

DRUM BRAKE INCLUDING AXLE AND ACTUATING CYLINDER DETAIL

This invention relates to a drum-type brake having a rotary drum and a stationary axle with a cylinder housing integral with the axle.

BACKGROUND OF THE INVENTION

Most of the conventional drum-type brakes shown in the prior art have a back plate or torque plate to which is fastened a cylinder housing which carries pistons for actuating the brake shoes. Such an arrangement has been satisfactory in many instances where space requirements are not a critical factor and the dimensions of the axle, the drum and other portions of the brake are such that the cylinder can be mounted on the back plate in this manner. During recent years, however, new designs in various types of vehicles and the brakes required for such vehicles have necessitated changes in brake requirements and in the space available for some of the brake components. In many instances, it has been desirable to simplify the brake structure and reduce the number of parts, not only to reduce the cost of such brakes, but to reduce the space required for installation of such brakes.

OBJECTS OF THE INVENTION

It is the primary object of this invention to provide a brake in which the cylinder housing is integral with the axle and which requires less space between the drum and the axle for installation of the various brake parts.

Another object of this invention is to provide a brake which is simple and inexpensive to manufacture and assemble.

A still further object of this invention is to provide a brake in which a minimum amount of maintenance of the various parts is required.

These and other objects of the invention will become more fully apparent as the description proceeds in the following specification and the appended drawings.

BRIEF DESCRIPTION OF THE DRAWINGS

FIG. 3 is a cross-sectional view of the brake of the invention taken on line 3–3 of FIG. 2 and showing a portion of a vehicle wheel attached to the brake drum and mounted on the axle;

FIG. 5 is a fragmentary cross-sectional view showing an integral cylinder housing on the axle containing a single cylinder.

DESCRIPTION OF THE PREFERRED EMBODIMENTS

Figure 4:
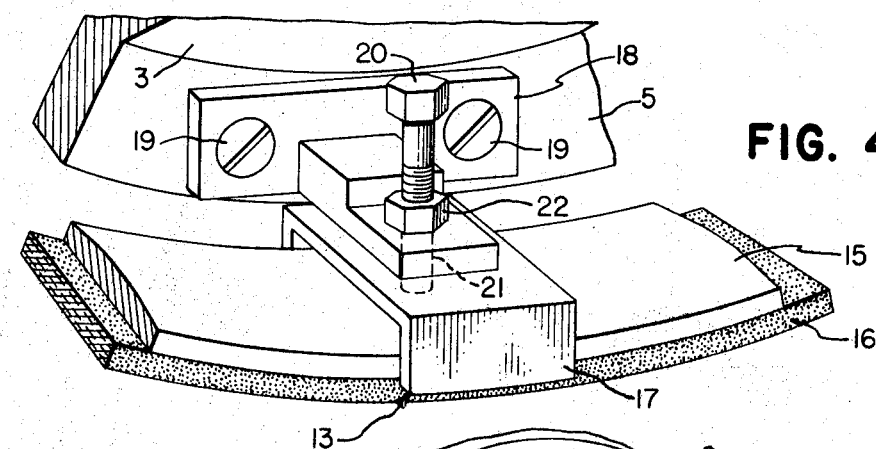
FIG. 4 is a fragmentary perspective view of one of the brake shoe guides.
Figure 1:
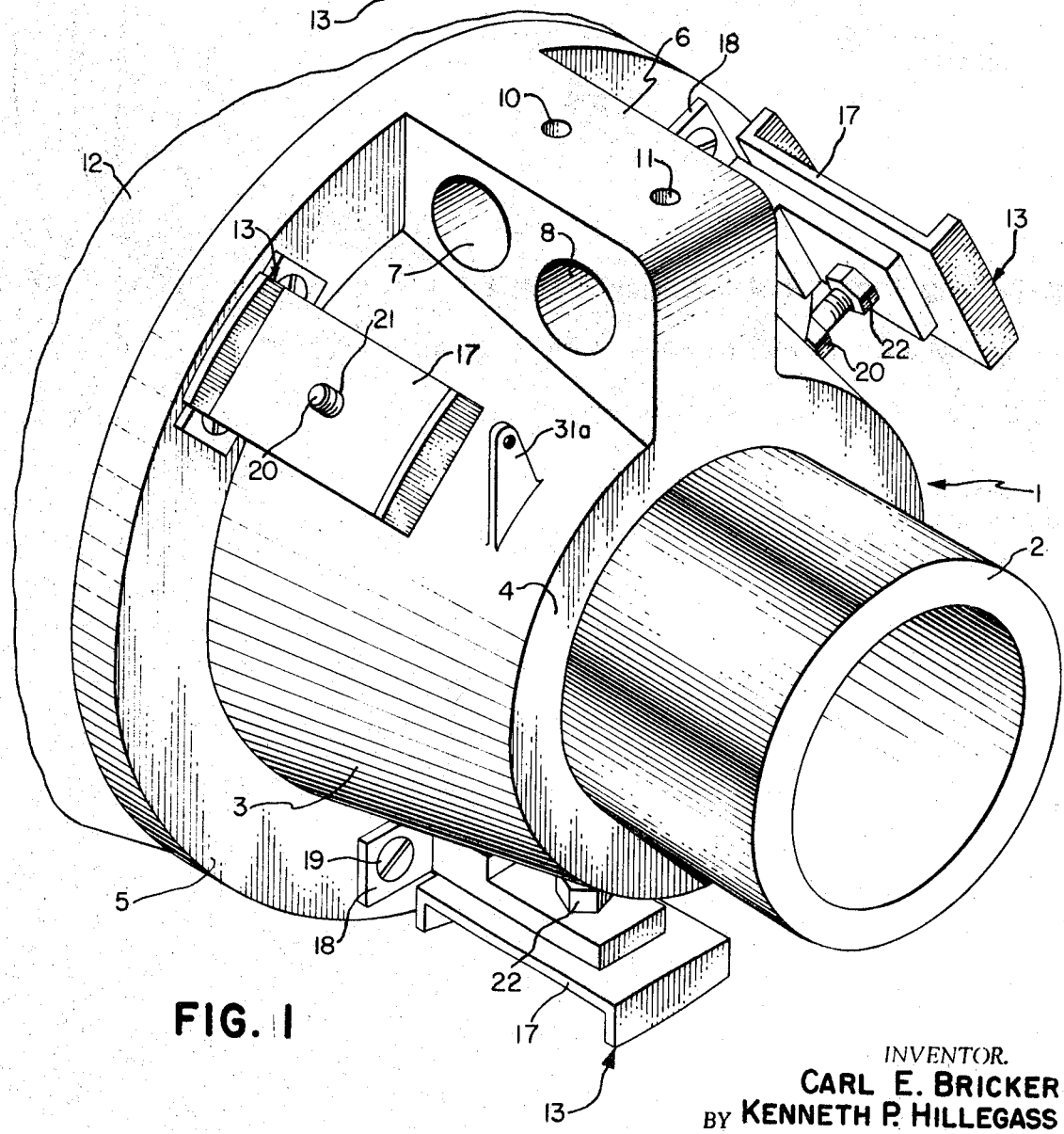
FIG. 1 is a fragmentary perspective view of an axle of this invention showing the integral cylinder housing.
Figure 2:
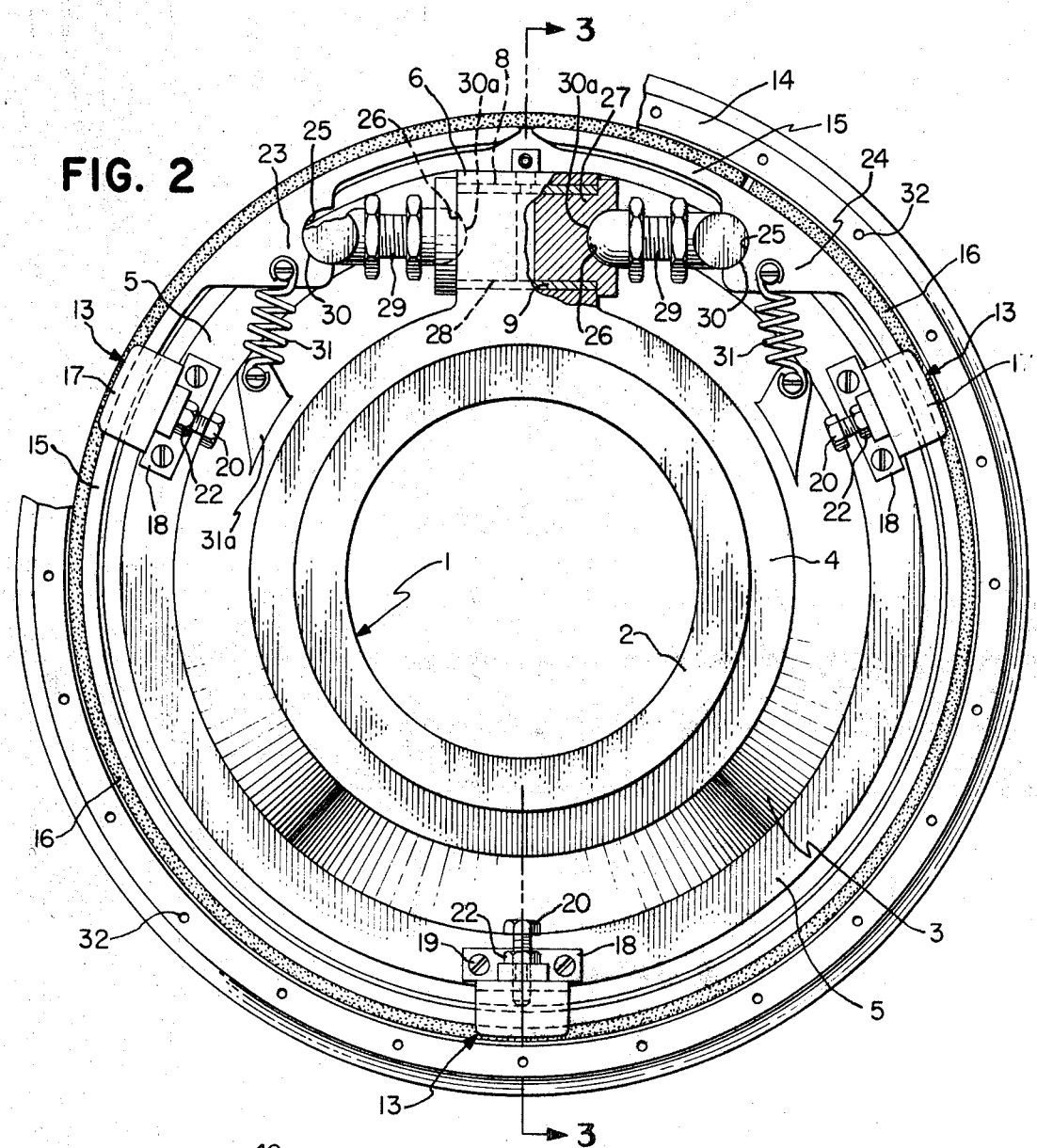
FIG. 2 is an end elevational view of the brake of the invention looking from the outer end of the axle and with portions broken away to better show one of the pistons within the cylinder housing.

Referring now to FIG. 1 of the drawings, a vehicle axle is indicated generally by the numeral 1. The axle 1 has a hollow cylindrical portion 2 at the outer end thereof for receiving a wheel. An integral frustoconical portion 3 is located axially inwardly from the cylindrical portion 2 and with the portion 3 increasing in diameter inwardly of the axle. The smaller end of the conical portion 3 is somewhat larger in diameter than the cylindrical portion 2. This provides an offset or step 4 between the portions 2 and 3. At the large end of the conical portion 3, the diameter of the axle again increases thereby providing a second step 5 similar to the step 4. The conical portion 3 carries an integral cylinder housing 6 containing a pair of cylinders 7 and 8 therethrough with the axis of the cylinders running transversely of the axis of the axle 1. The cylinder housing 6 is cast as an integral part with the rest of the axle 1. The cylinders 7 and 8 may be bored in the housing 6 with the bore of the cylinders serving as the inner wall. It is also possible to bore or cast the cylinders 7 and 8 in the axle 1 and then line the cylinders with a hollow cylindrical metal lining 9 as shown in FIGS. 2 and 3. Hydraulic inlet ports 10 and 11 are provided to supply hydraulic pressure to the cylinders 7 and 8 respectively. The axle 1 again increases in diameter axially inwardly of the step 5 to form an axially inner portion 12 which is fastened in a conventional manner to a vehicle carrying the axle. Since the manner of attachment to a vehicle does not form a part of this invention, it will not be illustrated or described in detail. It should be understood that the contour of the axle, as illustrated, is merely one of many variations of contour which may be used depending upon the type of vehicle involved and in the present instance, the conical portion is used in order to provide a larger diameter opening at the axially inner portion of the axle which is required by the particular needs of the vehicle for which this axle is used. It is obvious that other contours of axles may be used without departing from the scope of the invention so long as the cylinder housing is integral with the axle and is designed to transmit the torque from the rotating brake drum to the axle upon application of the brakes. Also illustrated in FIG. 1 are three brake shoe guides 13 spaced around the circumference of the conical portion 3 and attached to the step 5. The guides 13 are shown in detail in FIG. 4 and will be described further later in the specification.

Referring now to FIGS. 2 and 3 of the drawings, the axle 1 is shown surrounded by a rotary brake drum 14 with sufficient clearance provided between the axle 1 and the drum 14 to position therebetween, a split ring type single shoe 15 with a split ring single band friction lining 16 surrounding the circumference of the shoe 15. The shoe 15 and the lining 16 are positioned radially and axially with respect to the axle 1 and the drum 14 by the brake shoe guides 13. A typical brake shoe guide 13 is shown in greater detail in FIG. 4. The guide 13 comprises a U-shaped radially outwardly extending member 17 with the sides thereof extending along the edges of the brake shoe 15 and the lining 16. The sides of the member 17 prevent excess axial movement of the shoe 15 and the lining 16. The member 17 is fastened by a T-shaped bracket 18 to the step 5 on the axle 1 by bolts 19. An adjustment bolt 20 passes through a threaded hole 21 in the bracket 18 and the member 17 and bears against the radially inner face of the shoe 15 to position the shoe radially with respect to the axle 1 and the drum 14. A lock nut 22 is provided to prevent undesirable rotation of the bolt 20.

A pair of substantially triangular shaped blocks 23 and 24 are attached to the inner surface of the brake shoe 15 at a spaced location from each end thereof. Each of the blocks 23 and 24 has a substantially cylindrical opening 25 with the openings 25 being in opposed relationship to each other. A spherical opening 26 is provided in each of the pistons 27 and 28 located in the cylinders 7 and 8. In other words, each of the cylinders 7 and 8 carries a pair of opposed pistons 27 and 28 with the spherical openings 26 facing the outer end of the piston in opposed relationship to an adjacent cylindrical opening 25. A conventional threaded adjustable shank 29 has a cylindrical end surface 30 on one end and a pair of spherical end surfaces 30a on the other end thereof which substantially matches the contour of the cylindrical and spherical openings 25 and 26 respectively. As shown in FIGS. 2 and 3, when hydraulic fluid pressure enters the cylinders 7 and 8 through inlet ports 10 and 11, the pressure between the pistons 27 and 28 forces them axially away from each other and, in turn, causes the threaded shanks 29 to move axially away from each other and thereby force the brake shoe 15 to expand radially outwardly and cause the friction lining 16 to be squeezed between the brake shoe 15 and the drum 14. The lining 16 floats freely between the shoe 15 and the drum 14 until the brakes are applied. Upon application of the brakes, when sufficient pressure is exerted to force the lining 16 against the drum 14, the lining 16 locks in position between the drum and the shoe and causes the forces from the rotating drum 14 to be taken up through the lining 16 and the shoe 15 and ultimately transmitted through the cylinder housing 6 to the axle 1. A pair of springs 31 located on opposite side of the axle 1 each have one end attached to one of the blocks 23 and 24 and the other end connected to an ear 31a on the conical portion 3 of the axle 1. The purpose of the springs 31 is to hold the brake shoe 15 up against the lower brake shoe guide 13 in such manner that the shoe 15 and the lining 16 do not drag on the brake drum 14. With the springs 31 holding the shoe and lining against the lower shoe guide 13 and the two upper shoe guides assisting in maintaining the shoe and lining in substantially concentric relationship with the brake drum, by adjusting the bolts 20, any drag of the brake lining on the drum should be eliminated when the brakes are released. A plurality of threaded holes 32 are spaced around the edge of the brake drum 14 for bolting a wheel 33 to the drum, as shown in FIG. 3 by bolts 34. Also shown in FIG. 3 is a conventional wheel bearing 35 and a bearing seal 36 located in the region of the step 4 on the axle 1.

In the present embodiment shown, the primary purpose of using a pair of parallel cylinders 7 and 8 in side-by-side relationship is to further reduce the diameter required for this type of brake. In some instances, it may be desirable to use a single cylinder 37 as shown in FIG. 5 in an integral cylinder housing 38 on an axle 39.

Figure 6:
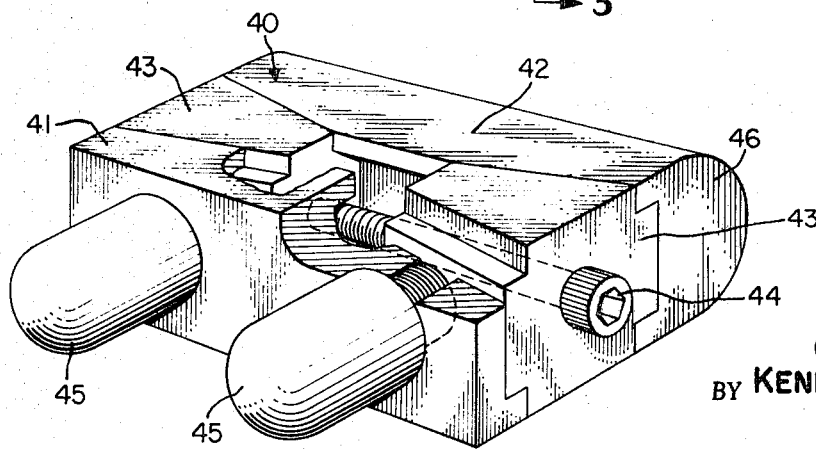
FIG. 6 is a perspective view of a different embodiment of the brake adjusting means.

It should also be understood that other means of brake wear adjustment can be provided as a substitute for the threaded shank 29 shown in FIGS. 2 and 3. A typical example of such adjustment means is shown in FIG. 6 wherein an expandable block indicated generally by the numeral 40 has a pair of opposed tapered side members 41 and 42 which are slidably engaged by a pair of substantially identical wedges 43 positioned therebetween and movable toward and from each by a screw 44 threaded through the center of both of the wedges 43. The side member 41 carries a pair of paralleled shanks 45 extending from one side thereof with each of the shanks 45 having a spherical end similar to the end 30a of the adjustable shanks 29. The side member 42 has a convex cylindrical surface 46 which engages the opening 25 in either the blocks 23 or 24 shown in FIG. 2 depending upon which side of the brake the block 40 is mounted. The pair of shanks 45 on the side member 41 engage the openings 26 in the pistons 27 or 28. Thus it may be seen that the embodiment shown in FIG. 6 may be substituted for the adjustment shank 29 shown in FIGS. 2 and 3. When the screw 44 is rotated in one direction, the wedges 43 are moved toward each other thereby forcing apart the tapered side members 41 and 42 and causing the block 40 to expand outwardly and thereby cause the brake shoe 15 to expand radially outwardly toward the drum 14. When the adjustment screw 44 is rotated in the opposite direction, the distance between the block 40 contracts and permits the springs 31 to pull the shoe 15 radially inwardly away from the drum 14.

The primary advantage of the embodiment shown in FIG. 6 over the use of the shank 29 shown in FIGS. 2 and 3 is that when there is insufficient clearance to permit a wrench to be used in turning the adjustment shank 29, use of the expandable block 40 shown in FIG. 6 permits adjustment without the need for inserting a wrench between the axle and the brake shoe in the manner required for the shank 29.

While in FIGS. 1 and 2 the shoe guides 13 are all shown to be adjustable radially with respect to the axle 1, it is often preferable that only the bottom guide be adjustable and the other guides to be fixed. There may, of course, be many variations in the construction of the adjustable guide 13 without departing from the invention. For example, the U-shaped member may be fixed and a rocker arm may be assembled on the guide to bear against the radially inner surface of the shoe 15 while the U-shaped member serves only as an edge guide to prevent axial movement of the shoe 15.

Various other modifications can be resorted to without departing from the scope of the invention.

We claim:
1. A brake comprising:
   A. a stationary hollow axle having a large diameter portion and a small diameter portion;
   B. a wheel rotatably carried by the small diameter portion of the axle;
   C. a cylinder housing integral with the periphery of the large diameter portion of the axle and having at least two parallel side-by-side cylinders in close proximity to said periphery of the axle, said cylinders having axes in a common plane, said plane being parallel to the axis of the axle;
   D. a brake drum surrounding the large diameter portion of the axle, said drum being attached to the wheel for rotation therewith;
   E. Frction leaming means between the drum and the axis;
   F. at least one brake shoe between the axle and the lining for urging the lining against the drum; and
   G. piston means in the cylinders for moving the shoe against the lining to force it against the drum;
   H. the torque from the rotating drum being transmitted to the axle through the integral cylinder housing when the brakes are applied;
   I. the size and relative positions of the cylinders with respect to the axle reducing the clearance required between the axle and the drum and permitting a larger diameter bore in the hollow axle.

2. A brake as claimed in claim 1 wherein each cylinder carries a pair of opposed pistons.

3. A brake as claimed in claim 1 wherein each cylinder has a metal lining inserted in the cylinder bore of the housing.

4. A brake as claimed in claim 1 wherein the brake has a split band type single shoe.

5. A brake as claimed in claim 4 wherein the brake has a split bank type floating lining.

6. A brake as claimed in claim 4 wherein the plurality of guides are attached around the circumference of the axle to position the brake shoe with respect to the axle and the drum, at least one of said guides being adjustable.